United States Patent
Tallam et al.

(10) Patent No.: US 8,174,810 B2
(45) Date of Patent: May 8, 2012

(54) METHOD AND APPARATUS FOR REDUCING DIFFERENTIAL MODE AND COMMON MODE REFLECTIONS IN MOTOR DRIVES

(75) Inventors: Rangarajan M. Tallam, Germantown, WI (US); Gary L. Skibinski, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 512 days.

(21) Appl. No.: 12/135,661

(22) Filed: Jun. 9, 2008

(65) Prior Publication Data
US 2009/0303652 A1 Dec. 10, 2009

(51) Int. Cl.
*H02H 3/20* (2006.01)
*H02H 9/04* (2006.01)
*H03H 5/00* (2006.01)

(52) U.S. Cl. .......... 361/91.1; 361/111; 333/25; 343/859

(58) Field of Classification Search .................. 361/91.1, 361/111; 333/25; 343/859
See application file for complete search history.

(56) References Cited

U.S. PATENT DOCUMENTS

| | | | |
|---|---|---|---|
| 5,831,410 A | | 11/1998 | Skibinski |
| 6,150,896 A | * | 11/2000 | DeCramer et al. .............. 333/25 |
| 6,886,065 B2 | * | 4/2005 | Sides et al. .................... 710/305 |
| 7,068,005 B2 | * | 6/2006 | Baker ........................... 318/611 |
| 2009/0122580 A1 | * | 5/2009 | Stamm et al. ................... 363/44 |

OTHER PUBLICATIONS

Bolsens, B., et al., Transmission Line Effects on Motor Feed Cables: Terminator Design and Analysis in the Laplace-Domain, Electric Machines and Drives Conference, 2003, IEMDC '03, IEEE International, vol. 3, 1-4, Jun. 2003, pp. 1866-1872, IEEE, Los Alamitos, California, USA.

* cited by examiner

*Primary Examiner* — Rexford Barnie
*Assistant Examiner* — Zeev V Kitov
(74) *Attorney, Agent, or Firm* — Boyle Fredrickson, S.C.; R. Scott Speroff; John M. Miller

(57) ABSTRACT

A filter device reduces reflections on power lines from the motor drive to AC motors by providing a differential mode choke in series with a common mode choke both shunted by resistances tailored to the characteristic impedance of the power cable for differential mode and common mode reflections respectively. By treating both common mode based and differential mode based reflections, superior transient control and motor drive performance may be obtained.

16 Claims, 3 Drawing Sheets

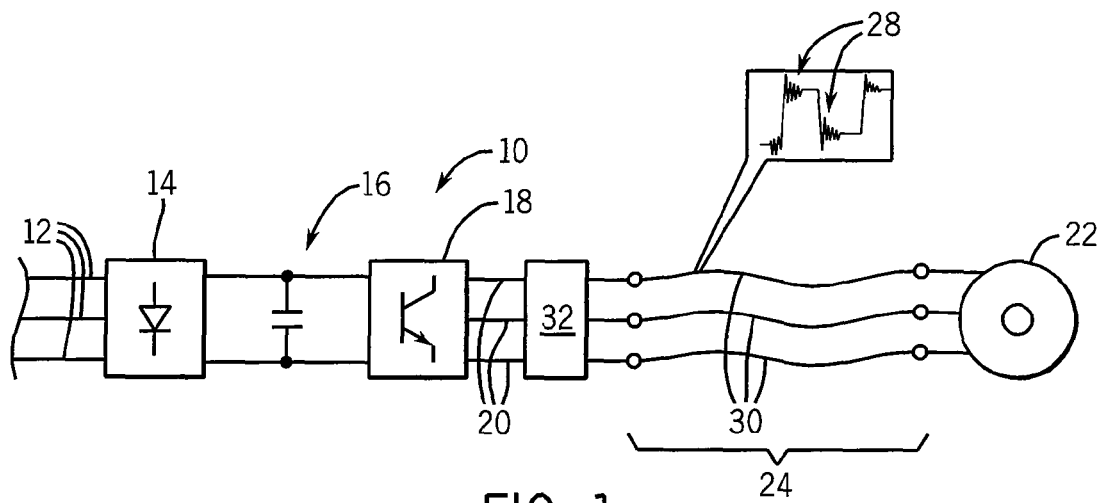
FIG. 1
PRIOR ART
FIG. 2
PRIOR ART
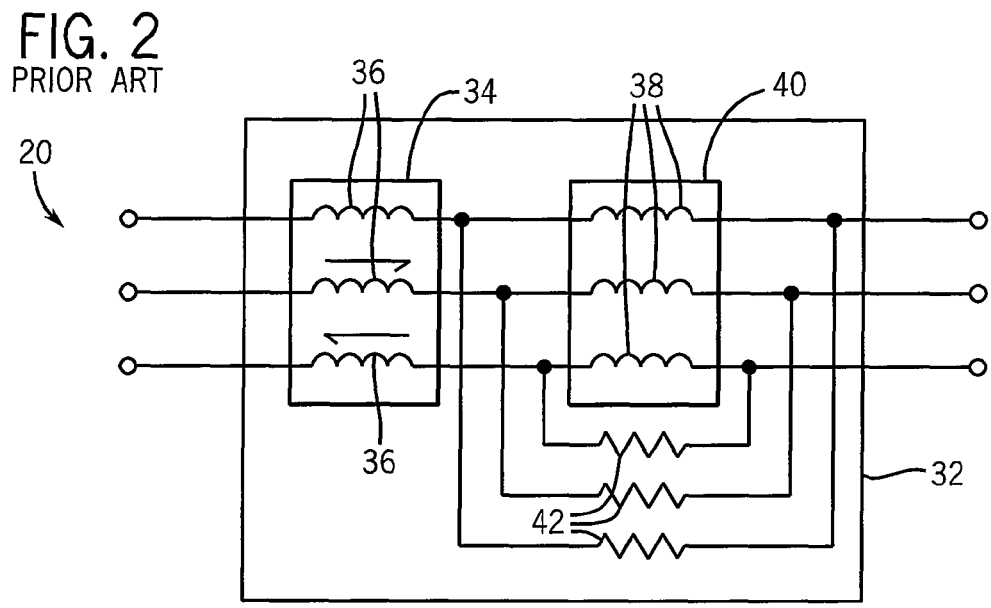
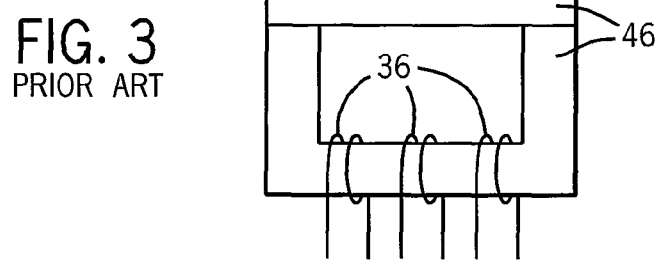
FIG. 3
PRIOR ART

METHOD AND APPARATUS FOR REDUCING DIFFERENTIAL MODE AND COMMON MODE REFLECTIONS IN MOTOR DRIVES

CROSS-REFERENCE TO RELATED APPLICATIONS

---

STATEMENT REGARDING FEDERALLY SPONSORED RESEARCH OR DEVELOPMENT

---

BACKGROUND OF THE INVENTION

The present invention relates to three-phase AC motor drives and particularly to a filter device for power lines communicating between such drives and a connected motor.

Common AC induction motors use three-phase electrical power connected to stator windings of the motor. Each stator winding receives a different conductor of a three-phase power transmission line, where each conductor communicates an AC power waveform shifted with respect to the other conductors by plus and minus 120°.

Referring to FIG. 1, the motor 22 may connect directly to a power grid or, as shown, connect to a solid-state motor drive 10. In this latter case, the motor drive 10 will receive three-phase power 12 from the power grid at a rectifier 14 and the rectifier 14 will convert the received three-phase AC power into DC power on a DC link 16. The rectifier 14 uses an active or passive rectification system of a type known in the art.

The DC power on the DC link 16 is received by an inverter 18 which synthesizes new three-phase power 20, for example, having a different frequency than the three-phase power 12 to provide for motor speed control or control of other motor parameters.

The synthesized three-phase power 20 may be communicated to the motor 22 by means of a power cable 24. Such power cable 24 may extend for hundreds or even thousands of feet allowing the motor drive 10 to be located at a substantial distance from the motor 22. Such power cables 24 normally include three conductors (one for each power phase) and one or more ground conductors within a conductive shield, the latter to reduce the transmission of electrical interference to surrounding equipment.

The distributed inductance and capacitance of the power cable 24 can create electrical reflections along the power cable 24 resulting generally from an impedance mismatch between the characteristic impedance of the power cable 24 and the motor 22, at one end of the power cable 24, and between the characteristic impedance of the power cable 24 and the inverter 18, at the other end of the power cable 24. These reflections produce voltage and current surges 28 that can damage conductor insulation, cause arcing across motor bearings, and boost the voltage on the DC link 16 damaging the inverter 18 or causing the inverter 18 to shut down to avoid damage.

U.S. Pat. No. 5,990,654 assigned to the assignee of the present invention and hereby incorporated by reference describes a filter device 32 receiving the three-phase power 20 from the inverter 18 on one side through a relatively short cable where reflections are not a problem and attaching to the power cable 24 on the other side. The filter device 32 operates to reduce surges 28 by reducing reflections on the power line 24.

Referring now to FIG. 2, for this purpose, the filter device 32 may include a common mode choke 34 having three inductors 36, one attached to each conductor of each different phase of the synthesized three-phase power 20. Each of these inductors 36 is connected in series with one corresponding inductor 38 of three inductors 38 of a differential mode choke 40.

As is generally understood in the art, and as shown in FIG. 3, the common mode choke 34 forms each inductor 36 as a separate coil wound around a common core 46, with a well known geometry such as a toroidal core or a U-I core. In this way, the flux path passes through each inductor 36 in series so that each of the inductors 36 presents a relatively high impedance to common mode current components (those having a phase alignment) and a relatively low impedance to differential mode current components (those not aligned in phase).

In contrast, as shown in FIG. 4, the differential mode choke 40 forms each inductor 38 as a separate coil wound on one leg of an E-core 50 whose legs are bridged by an I-core 52 to provide a parallel rather than series flux path through each inductor 38. In contrast to the common mode choke 34, the differential mode choke 40 presents a relatively high impedance to differential mode current components and a relatively low impedance to common mode current components.

The common mode choke 34 and differential mode choke 38 can also be wound on a single magnetic structure 41, as shown in FIG. 5. The differential mode portion of this choke is formed by each inductor 38 as a separate coil wound on one leg of an E-core 50 whose legs are bridged by an I-core 52. The common mode portion of this choke is formed by each inductor 36 as a separate coil wound around the common U-core 46 bridged by the I-core 52, which is shared with the differential mode portion of the choke. Each of the common mode inductors 36 is connected in series with one corresponding differential mode inductor 38. This series combination provides high impedance to both common mode and differential mode current components.

Referring still to FIG. 2, each of the inductors 38 of the differential mode choke 40 is shunted by a resistor 42 connected in parallel with the individual inductor 38. These resistors 42 have impedance selected to provide a matching to a characteristic impedance of the power cable 24 to thereby reduce reflections on the power cable 24 at the interface between the filter device 32 and the power cable 24.

While the filter device 32 may significantly reduce reflections on the power line 24, significant surges 28 may still occur in certain cases.

BRIEF SUMMARY OF THE INVENTION

The present inventors have recognized that there are, in fact, two different reflection modes associated with the power cable, a reflection mode related to the power cable's common mode impedance and a reflection mode related to the power cable's differential mode impedance. The prior art filter device reduced differential mode reflection (and hence transients) while still permitting common mode reflections and transients. Common mode voltage and current transients can cause premature bearing failure by creating a condition for arcing across the bearings, pitting the finely machined bearing surfaces.

Generally, the present invention works by providing separate impedance matching for the common mode impedance and differential mode impedance of the power line. In particular, the common mode choke and differential mode choke of the prior art are used to apply the appropriate resistance to the appropriate reflection mode thereby addressing both common mode and differential mode impedance mismatch. For a common type of power cable, the resistor values used for these different impedance matching requirements may be close to each other making it possible to use the same resistor (with an increase in power rating) for the suppression of both common mode and differential mode reflections.

Specifically, the present invention provides an apparatus for reducing electrical transients on a supply cable having three conductors and providing three-phase power to an AC motor from a solid-state motor drive. The apparatus includes a common mode choke having three inductors and a differential mode choke having three inductors, each of the latter inductors connected in series with a corresponding inductor of the common mode choke. Each of the series connected inductors of the differential mode choke and common mode choke are connected in series with one conductor of the power cable. A resistor is placed in parallel with each of the inductors of the common mode choke.

It is thus an object of one embodiment of the invention to address reflections caused by mismatch with the common mode characteristic impedance of the power cable thereby reducing common mode surge voltages or currents. Placing the resistors in parallel with the common mode choke helps to damp common mode voltage and current reflections.

The resistors may be connected in parallel across each inductor of the common mode choke.

It is thus an object of one embodiment of the invention to damp common mode reflections with an independent set of resistors.

The resistors may be substantially equal to the common mode characteristic impedance of the power cable.

It is thus an object of one embodiment of the invention to provide a simple method of determining resistor value.

The resistor is substantially 50 ohms.

It is thus another object of one embodiment of the invention to provide a resistor value suitable for common shielded cables.

The invention may further include a resistor connected in parallel across each inductor of the differential mode choke.

It is thus an object of one embodiment of the invention to damp differential mode reflections with a different, independent set of resistors.

In an alternative embodiment, the resistors may be connected in parallel across the series connected inductors of the differential mode choke and the common mode choke.

It is thus an object of one embodiment of the invention to provide a circuit topology that, by permitting the use of similar values of the shunting resistors for common mode and differential mode reflections, allows one set of resistors to attenuate both common mode and differential mode reflections.

The resistors may be substantially equal to the average of the differential mode characteristic impedance and common mode characteristic impedance of the power cable.

It is thus an object of one embodiment of the invention to provide for a single resistor value for cables where the desired resistance for the common mode and differential mode impedances are similar but not the same.

The resistors may be substantially 50 ohms.

It is thus an object of one embodiment of the invention to provide a simplified circuit topology and resistor value that may be used with common cable types.

The common mode choke and differential mode choke may be wound on magnetically separate cores.

It is thus an object of one embodiment of the invention to permit the invention to be fabricated from commonly available components without requiring specialized choke construction.

In an alternative embodiment, the resistors may be connected in parallel across an integrated choke that provides both common mode and differential mode impedance.

It is thus an object of the invention to provide an embodiment with reduced component count.

The resistors may be substantially 50 ohms

It is thus an object of one embodiment of the invention to permit the invention to be fabricated from commonly available components that allow for a compact design.

These particular features and advantages may apply to only some embodiments falling within the claims and thus do not define the scope of the invention.

BRIEF DESCRIPTION OF THE DRAWINGS

FIG. 1 is a block diagram of a standard motor drive employing a filter device as described in the background of the invention;

FIG. 2 is a schematic representation of the filter device of FIG. 1 providing a common mode and differential mode choke;

FIG. 3 is a diagram of a common mode choke of the prior art;

DETAILED DESCRIPTION OF THE PREFERRED EMBODIMENT

Figure 4:
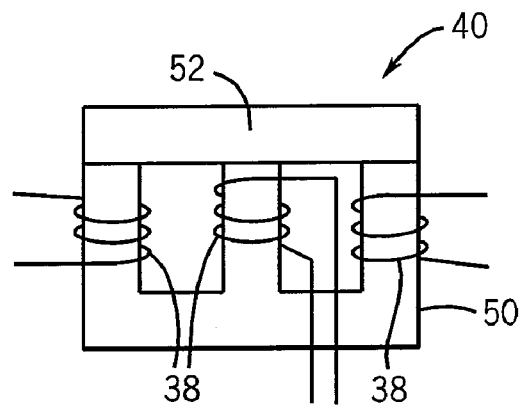
FIG. 4 is a diagram of a differential mode choke of the prior art.
Figure 5:
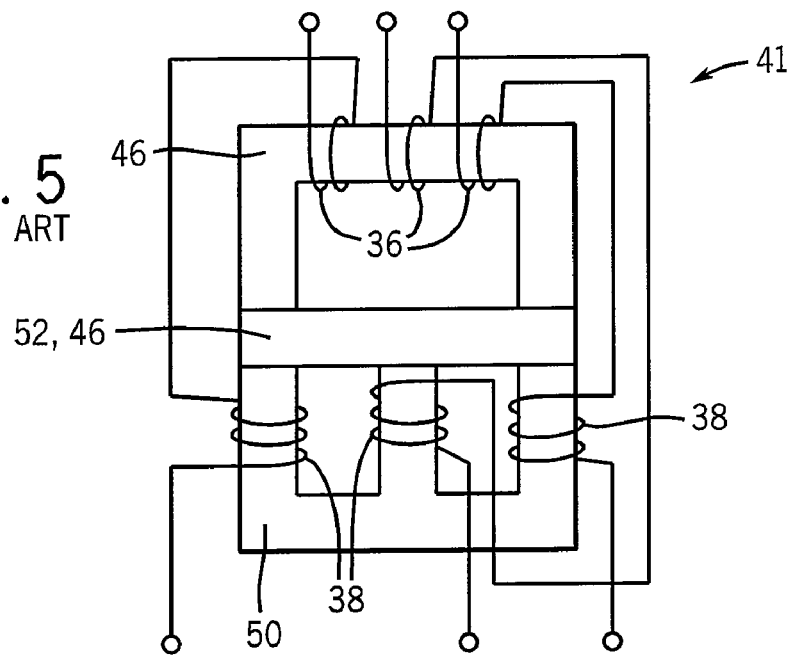
FIG. 5 is a diagram of an integrated common mode and differential mode choke of the prior art.
Figure 6:
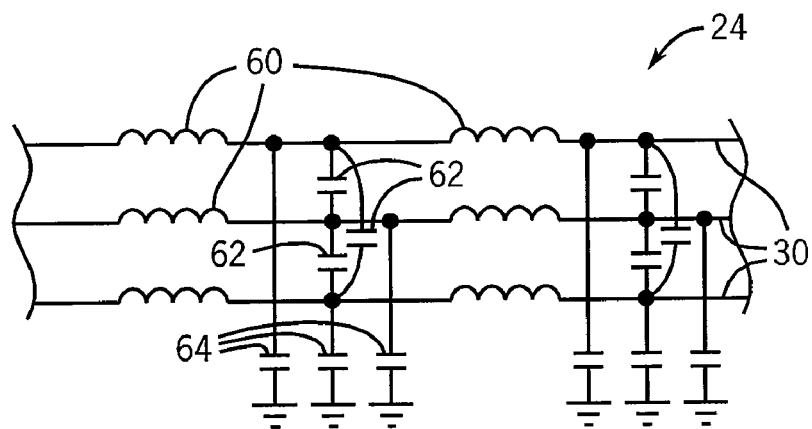
FIG. 6 is a discretized representation of the distributed inductance and capacitance of the typical power cable illustrating the divergence between common mode impedance and differential mode impedance underlying the present invention.

Referring now to FIG. 6, the conductors 30 of power cable 24 may have an intrinsic inductance represented by discrete inductors 60 distributed in series along the length of each power conductor 30.

A differential mode impedance will be determined by these inductors 60 together with capacitors 62 passing between each conductor 30 and its neighbor representing the distributed capacitance among the conductors 30, and capacitors 64 passing from each conductor 30 to ground typically presented by a shield around the conductors 30.

The common mode characteristic impedance of the power cable 24, in contrast, will be determined by inductors 60 together with capacitors 64 passing from each conductor 30 to ground.

In practice, the differential mode impedance is measured from one end of any conductors 30 to the other two conductors connected to each other at that end and with all three conductors connected to each other at the other end. This differential impedance measurement normally involves the application of a voltage step across the conductors 30 and measurement of the amplitude of the resulting current pulse.

In contrast, the common mode impedance measurement connects the ends of all three of the conductors 30 together and applies a similar step voltage between ground and the commonly connected conductors 30.

For a typical shielded power cable 24, the differential mode impedance may be approximately 50 ohms whereas the common mode impedance may be approximately 15 ohms.

Figure 7:
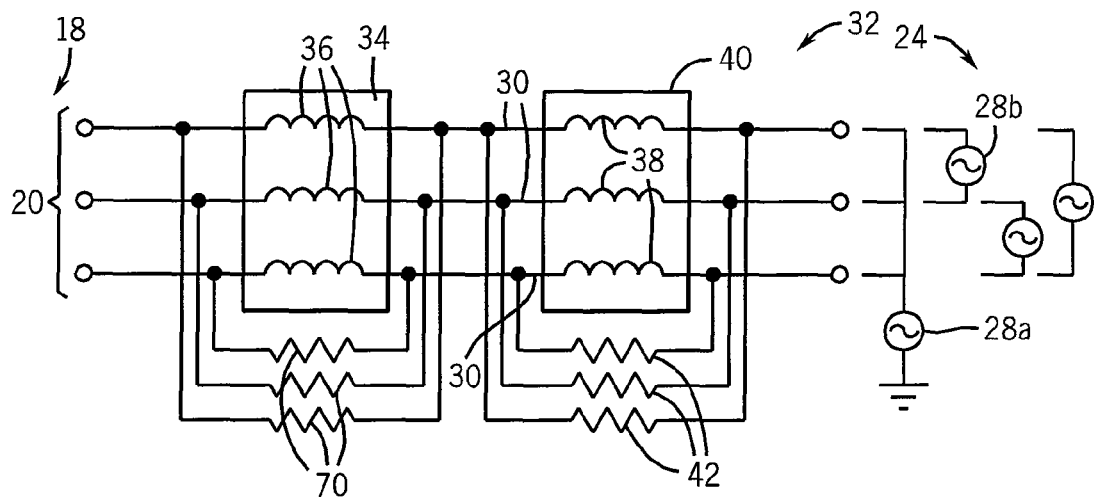
FIG. 7 is a schematic representation similar to that to that of FIG. 2 of a filter device in a first embodiment of the present invention.

Referring now to FIG. 7, in a first embodiment, the present invention provides a filter device 32 having a common mode choke 34 with three inductors 36 and a differential mode choke 40 with three inductors 38. Each inductor 36 is connected in series with one corresponding inductor 38. As described above with respect to FIG. 2, each of the inductors 38 may be connected in parallel with a resistor 42. In contrast to the prior art, each of the inductors 36 of the common mode choke 34 is also shunted by resistors, in this case by the parallel connection of a resistor 70 across each of the inductors 36.

For common mode transients 28a represented by a voltage source applied to each of the conductors 30, the differential mode choke 40 will provide a low impedance passing these transients 28a to the common mode choke 34. The common mode choke 34, in contrast, presents a relatively high impedance to the transients 28a so that the impedance experienced by common mode transients 28a will be determined by the resistors 70.

For a typical power cable 24 having a common mode impedance of approximately 15 ohms, impedance matching will occur when each of the resistors 70 has a resistance of approximately 45 ohms. The common mode transient 28a will thus experience an impedance within the filter device 32 of three 45 ohm resistors in parallel, equaling 15 ohms.

For differential mode transients 28b, a high impedance will be presented by the inductors 38 of the differential mode choke 40 presenting an impedance to the transients 28b characterized by the resistors 42. The common mode choke 34, in contrast, presents a relatively low impedance to the transients 28b effectively bypassing the effect of resistors 70.

For a typical power cable 24 having a differential mode impedance of approximately 50 ohms, each resistor 42 will also have a value equal to 50 ohms. The differential mode transient 28b will experience an impedance within the filter device 32 equaling the value of each resistor 42 of 50 ohms.

As will be understood from this description, for common power cables 24, resistors 70 and 42 may have similar values (e.g. 45 ohms and 50 ohms). In this case, a compromise may be made approximating the value of resistor 70 as 50 ohms (or resistor 42 as 45 ohms). Through this compromise, by making resistors 70 and 42 equal to a compromise value somewhere between (or including) the two actual values, it will be understood that the function of the resistors 70 and 42 may be combined into single resistor 80 (as shown in FIG. 8).

Figure 8:
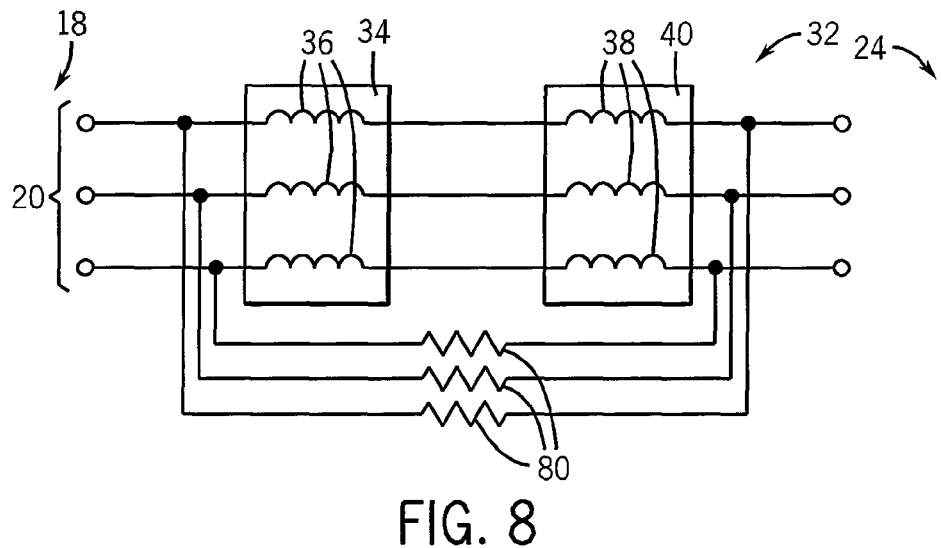
FIG. 8 is a schematic representation similar to that of FIG. 7 of an alternative embodiment of the present invention providing dual use for the damping resistors.

Referring to FIG. 8, resistors 80 shunt the series connected combination of the inductors 36 of the common mode choke 34 and the inductors 38 of the differential mode choke 40 so that one resistor 80 is in parallel with the series connected inductors 36 and 38. This reduction in the number of resistors is possible because the common mode choke 34 and differential mode choke 40 serve to steer transients 28a and 28b separately to resistors 80. Thus, common mode choke 34 provides a high impedance steering common mode transients 28a to resistors 80, and differential mode choke 40 provides a high impedance steering differential mode transients 28b to resistors 80. This dual function of resistors 80 will require resistors 80 to have a higher wattage value than resistors 70 and 42.

Figure 9:
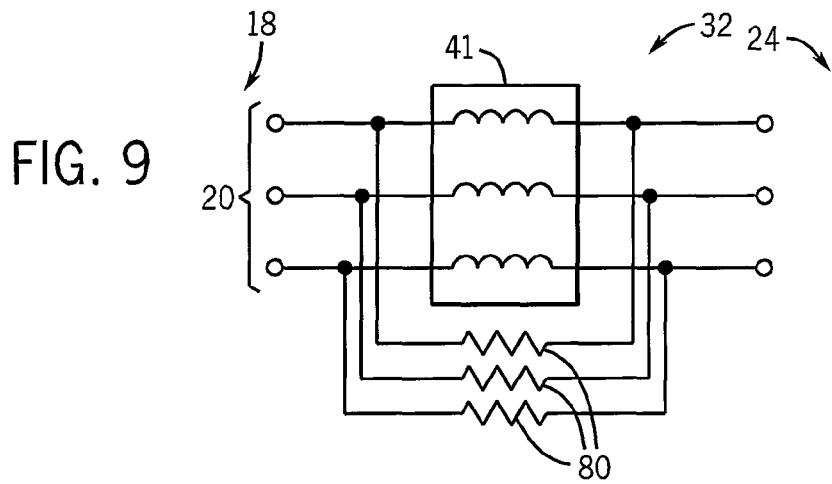
FIG. 9 is a schematic representation similar to that of FIG. 7 of an alternative embodiment of the present invention using an integrated common mode and differential mode magnetic device and providing dual use for the damping resistors.

Referring to FIG. 9, resistors 80 shunt an integrated magnetic structure 41 that provides both common mode and differential mode impedance. The resistors 80 function to damp both differential mode and common mode transients, and hence will be required to have a higher wattage value than resistors 70 and 42.

Because the common mode characteristic impedance and differential mode characteristic impedance of power cable 24 are essentially independent of cable length, a filter device 32 may be constructed and used freely with cables of a variety of lengths long enough to present significant reflection problems.

It is specifically intended that the present invention not be limited to the embodiments and illustrations contained herein and the claims should be understood to include modified forms of those embodiments including portions of the embodiments and combinations of elements of different embodiments as come within the scope of the following claims. For example, while the present invention describes three-phase motors and drives it will be understood that the present invention will apply to higher order phases and that the term "three-phase" should be considered to embrace any system having at least three phases.

We claim:

1. An apparatus for reducing electrical transients on a power cable having three conductors to provide three-phase power to an AC motor from a solid-state motor drive, the apparatus comprising:
   a common mode choke having three inductors;
   a differential mode choke having three inductors each connected in series with a corresponding inductor of the common mode choke, the series connected inductors of the differential mode choke and common mode choke each connected in series with one conductor of the power cable; and
   resistors bypassing each of the inductors of the common mode choke, wherein each resistor is connected in parallel across one pair of the series connected inductors of the differential mode choke and the common mode choke.

2. The apparatus of claim 1 wherein the resistor is substantially equal to a compromise value between the differential mode characteristic impedance and common mode characteristic impedance of the power cable.

3. The apparatus of claim 1 wherein the resistor is substantially 50 ohms.

4. An apparatus for reducing common mode and differential mode electrical transients on a multi-phase power cable, the apparatus comprising:
   a first set of inductors configured to reduce the common mode electrical transients, each inductor connected in series with one of the phases of the power cable;
   a second set of inductors configured to reduce the differential mode electrical transients, each inductor connected in series with one of the inductors of the first set of inductors and the corresponding phase of the power cable; and
   a set of resistances, each resistance bypassing one of the pair of series connected inductors.

5. The apparatus of claim 4 wherein each resistance includes a resistor connected in parallel across both of the series connected inductors.

6. The apparatus of claim 5 wherein the value of the resistor is substantially equal to a compromise value between a differential mode characteristic impedance and a common mode characteristic impedance of the power cable.

7. The apparatus of claim 5 wherein the value of the resistor is substantially 50 ohms.

8. The apparatus of claim 4 further comprising
a first core around which the first set of inductors is wound; and
a second core around which the second set of inductors is wound.

9. The apparatus of claim 8 wherein the first core and the first set of inductors define a common mode choke and the second core and the second set of inductors define a differential mode choke.

10. The apparatus of claim 4 further comprising an integrated core around which each of the first set and the second set of inductors is wound.

11. The apparatus of claim 10 wherein the integrated core, the first set of inductors, and the second set of inductors define an integrated common mode and differential mode choke.

12. The apparatus of claim 10 wherein the integrated core further comprises:
   a U-I core, wherein each of the inductors of the first set of inductors is wound around the U portion of the U-I core;
   a E-I core, wherein each of the inductors of the second set of inductors is wound around a separate leg of the E portion of the E-I core and wherein the I portion of the U-I core and the E-I core is common between the cores.

13. A method for reducing electrical transients on a multi-phase power cable, comprising the steps of:
   (a) connecting each inductor of a common mode choke in series with a corresponding inductor of a differential mode choke;
   (b) placing each of the series-connected inductors in series with one conductor of the multi-phase power cable; and
   (c) bypassing each pair of the series-connected inductors with a resistance.

14. The method of claim 13 wherein the step of bypassing each of the series-connected inductors includes connecting a resistor in parallel across both of the series connected inductors.

15. The method of claim 14 wherein the value of the resistor is substantially equal to a compromise value between a differential mode characteristic impedance and a common mode characteristic impedance of the power cable.

16. The apparatus of claim 4 wherein the multi-phase cable includes at least three phases and wherein the multi-phase cable is configured to be connected to an inverter at a first end and the series connected inductors at a second end.

* * * * *